US011451771B2

(12) United States Patent
Yao et al.

(10) Patent No.: US 11,451,771 B2
(45) Date of Patent: Sep. 20, 2022

(54) MOVING-IMAGE DECODER USING INTRA-PREDICTION, MOVING-IMAGE DECODING METHOD USING INTRA-PREDICTION, MOVING-IMAGE ENCODER USING INTRA-PREDICTION, MOVING-IMAGE ENCODING METHOD USING INTRA-PREDICTION, AND COMPUTER READABLE RECORDING MEDIUM

(71) Applicant: KDDI CORPORATION, Tokyo (JP)

(72) Inventors: Qiang Yao, Tokyo (JP); Kei Kawamura, Tokyo (JP); Sei Naito, Tokyo (JP)

(73) Assignee: KIDDI CORPORATION, Tokyo (JP)

( * ) Notice: Subject to any disclaimer, the term of this patent is extended or adjusted under 35 U.S.C. 154(b) by 0 days.

(21) Appl. No.: 16/329,601

(22) PCT Filed: Jul. 28, 2017

(86) PCT No.: PCT/JP2017/027459
§ 371 (c)(1),
(2) Date: Feb. 28, 2019

(87) PCT Pub. No.: WO2018/055910
PCT Pub. Date: Mar. 29, 2018

(65) Prior Publication Data
US 2019/0230374 A1 Jul. 25, 2019

(30) Foreign Application Priority Data

Sep. 21, 2016 (JP) .............................. JP2016-184653

(51) Int. Cl.
*H04N 19/11* (2014.01)
*H04N 19/44* (2014.01)
(Continued)

(52) U.S. Cl.
CPC ........... *H04N 19/11* (2014.11); *H04N 19/105* (2014.11); *H04N 19/137* (2014.11);
(Continued)

(58) Field of Classification Search
CPC ......... H04N 19/11; H04N 19/33; H04N 19/44
See application file for complete search history.

(56) References Cited

U.S. PATENT DOCUMENTS 8,948,529 B1 * 2/2015 Maaninen ............ H04N 19/176
382/232
2006/0072676 A1 * 4/2006 Gomila .................. H04N 19/61
375/240.27
(Continued)

FOREIGN PATENT DOCUMENTS

EP 2129135 A1 12/2009
JP 2007-300380 A 11/2007
(Continued)

OTHER PUBLICATIONS

U.S. Appl. No. 62/309,991, filed Mar. 18, 2016 (Year: 2016).*
(Continued)

*Primary Examiner* — David N Werner
(74) *Attorney, Agent, or Firm* — Greenblum & Bernstein P.L.C.

(57) ABSTRACT

A moving-image decoder includes a decoding means configured to decode a bitstream representing a moving image including a block encoded using intra-prediction, an inverse processing means configured to generate difference values in pixels of the block by inverse-quantizing and inverse-transforming a level value of the block obtained from a result of decoding, an intra-prediction means configured to generate predicted values of pixels of the block according to intra-prediction based on pixel values of reconstructed blocks around the block, and a reconstruction means configured to
(Continued)

reconstruct the block on the basis of the generated difference values and the generated predicted values, wherein the intra-prediction means is configured to generate a reference line for use in the intra-prediction by synthesizing a plurality of lines of the reconstructed blocks around the block.

10 Claims, 13 Drawing Sheets

(51) Int. Cl.
| | | |
|---|---|---|
| *H04N 19/137* | (2014.01) | |
| *H04N 19/176* | (2014.01) | |
| *H04N 19/159* | (2014.01) | |
| *H04N 19/174* | (2014.01) | |
| *H04N 19/105* | (2014.01) | |
| *H04N 19/70* | (2014.01) | |
| *H04N 19/593* | (2014.01) | |
| *H04N 19/33* | (2014.01) | |

(52) U.S. Cl.
CPC ......... *H04N 19/159* (2014.11); *H04N 19/174* (2014.11); *H04N 19/176* (2014.11); *H04N 19/33* (2014.11); *H04N 19/44* (2014.11); *H04N 19/45* (2014.11); *H04N 19/593* (2014.11); *H04N 19/70* (2014.11)

(56) References Cited

U.S. PATENT DOCUMENTS

| | | | | |
|---|---|---|---|---|
| 2007/0053433 | A1* | 3/2007 | Song | H04N 19/147 375/240.13 |
| 2007/0053443 | A1* | 3/2007 | Song | H04N 19/105 375/240.24 |
| 2007/0121728 | A1* | 5/2007 | Wang | H04N 19/51 375/E7.113 |
| 2007/0253483 | A1* | 11/2007 | Lee | H04N 19/176 375/240.12 |
| 2009/0116760 | A1* | 5/2009 | Boon | H04N 19/105 382/238 |
| 2011/0038415 | A1* | 2/2011 | Min | H04N 19/105 375/E7.243 |
| 2011/0243225 | A1* | 10/2011 | Min | H04N 19/50 375/E7.243 |
| 2012/0106640 | A1* | 5/2012 | Shen | H04N 19/11 375/E7.243 |
| 2012/0300838 | A1* | 11/2012 | Ma | H04N 19/117 375/240.12 |
| 2012/0300844 | A1* | 11/2012 | Ma | H04N 19/51 375/240.16 |
| 2013/0016777 | A1* | 1/2013 | Gao | H04N 19/176 375/240.12 |
| 2013/0243091 | A1* | 9/2013 | Ye | H04N 19/176 375/240.16 |
| 2014/0010295 | A1* | 1/2014 | Lu | H04N 19/176 375/240.12 |
| 2014/0092980 | A1* | 4/2014 | Guo | H04N 19/593 375/240.16 |
| 2015/0110170 | A1* | 4/2015 | Lin | H04N 19/597 375/240.02 |
| 2015/0365684 | A1* | 12/2015 | Chen | H04N 19/593 375/240.13 |
| 2016/0073107 | A1 | 3/2016 | Moon et al. | |
| 2017/0094271 | A1* | 3/2017 | Liu | H04N 19/105 |
| 2017/0272757 | A1* | 9/2017 | Xu | H04N 19/105 |
| 2017/0310959 | A1* | 10/2017 | Chen | H04N 19/105 |
| 2017/0347093 | A1* | 11/2017 | Yu | H04N 19/105 |
| 2017/0353730 | A1* | 12/2017 | Liu | H04N 19/105 |
| 2018/0020214 | A1 | 1/2018 | Wang et al. | |
| 2018/0035123 | A1* | 2/2018 | Wennersten | H04N 19/44 |

FOREIGN PATENT DOCUMENTS

| | | |
|---|---|---|
| JP | 2008-271371 | 11/2008 |
| JP | 2013-141187 A | 7/2013 |
| WO | 2008/102805 | 8/2008 |
| WO | 2018/016823 | 1/2018 |

OTHER PUBLICATIONS

U.S. Appl. No. 62/359,822, filed Jul. 8, 2016 (Year: 2016).*
"High Efficiency Video Coding", ITU-T H.265, Apr. 2015.
Li, "Multiple line-based intra prediction", JVET-C0071, May 2016.
Zhao et al., "Fast Mode Decision Algorithm for Intra Prediction in HEVC", ResearchGate, Nov. 2011.
Ma, "Low Complexity Rate Distortion Optimization for HEVC", Data Compression Conference, Mar. 2013.
Seo et al., "CE6.a: Bi-Intra Prediction using Slope information", JCTVC-E JCTVC-E170, Mar. 17, 2011, pp. 143-747.
International Search Report issued in International Bureau of WIPO Patent Application No. PCT/JP2017/027459, dated Oct. 17, 2017.
Qing Yao, Kei Kawamura and Sei Naito, Reference Line Generation for Intra Predic t ion, Joint Video Exploration Team (JVET) of ITU-T SG 16 WP 3 and ISO/IEC JTC 1/SC 29/WG 11, 4th Meeting; Chengdu, CN, Oct. 2016, JVET-D0045, pp. 1-4.
Office Action dated Oct. 29, 2019 issued in Japanese Patent Application No. 2016-184653 with corresponding English translation.
Notice of allowance dated Mar. 9, 2021 issued in Japanese Patent Application No. 2020-030864 along with an English translation.
European Search report dated Apr. 6, 2020 issued in European Application No. 17852691.9.
Matsuo Shohei et al: "Intra prediction with spatial gradients and multiple reference lines Â", Picture Coding Coding Symposium 2009; Jun. 5, 2009-Aug. 5, 2009; Chicago,, May 6, 2009 (May 6, 2009).
Shohei Matsuo et al: "Extension of Intra Prediction Using Multiple Reference Lines", 32. VCEG Meeting; 80. MPEG Meeting; Apr. 23, 2007-Apr. 27, 2007; San Jose;(Video Coding Experts Group of ITU-T SG.16),, No. VCEG-AF05, Apr. 19, 2007 (Apr. 19, 2007), XP030003526.
Jiahao Li et al: "Multiple Line-based Intra Prediction for High Efficiency Video Coding", arxiv.org, Cornell University Library, 201 Olin Library Cornell University Ithaca, NY 14853, May 26, 2016 (May 26, 2016), XP080703879.

* cited by examiner

FIG. 8

| REFERENCE LINE | INTRA-PREDICTION MODE | COARSE CHECKING COST | CANDIDATE? | R-D COST |
|---|---|---|---|---|
| NEAREST LINE | 2 | 8 | Y | 14 |
| | 3 | 9 | Y | 16 |
| | 4 | 13 | N | N/A |
| | ... | ... | ... | ... |
| | 34 | 10 | Y | 17 |
| GENERATED LINE | 2 | N/A | Y | 6 |
| | 3 | N/A | Y | 8 |
| | 4 | N/A | N | N/A |
| | ... | ... | ... | ... |
| | 34 | N/A | Y | 7 |

712

MOVING-IMAGE DECODER USING INTRA-PREDICTION, MOVING-IMAGE DECODING METHOD USING INTRA-PREDICTION, MOVING-IMAGE ENCODER USING INTRA-PREDICTION, MOVING-IMAGE ENCODING METHOD USING INTRA-PREDICTION, AND COMPUTER READABLE RECORDING MEDIUM

TECHNICAL FIELD

The present invention relates to a moving-image decoder, a moving-image decoding method, a moving-image encoder, a moving-image encoding method, and a computer readable recording medium.

Priority is claimed on Japanese Patent Application No. 2016-184653, filed Sep. 21, 2016, the content of which is incorporated herein by reference.

BACKGROUND ART

A moving-image encoding scheme using intra-prediction or inter-prediction, a residue transform, and entropy encoding has been proposed (see, for example, Non-Patent Document 1).

Spatial redundancy of an image can be reduced using intra-prediction. A basic mechanism of intra-prediction is as follows. First, a reference line adjacent to (the top and the left of) a prediction block is generated, and an original sample in the prediction block is projected onto the reference line in a selected prediction direction. Thereafter, a difference (a residue or an error) between a sample of the reference line and the original sample projected onto the reference line is transformed and quantized.

Therefore, the reference line is one of important factors that determine the accuracy of intra-prediction. For example, in Non-Patent Document 2, technology for selecting one reference sample line on the basis of cost evaluation from a plurality of reference sample lines is proposed.

CITATION LIST

Non-Patent Literature

ITU-T H.265 High Efficiency Video Coding.

J. Li, B. Li, J. Xu, R. Xiong, and G. J. Sullivan, "Multiple line-based intra-prediction,"

JVET-C0071, May 2016.

Liang Zhao, Li Zhang, et al. "Fast Mode Decision Algorithm for Intra-prediction in HEVC", ResearchGate, November 2011.

Siwei Ma, Shiqi Wang, Shanshe Wang, Liang Zhao, Qin Yu, Wen Gao, "Low Complexity Rate Distortion Optimization for HEVC", 2013 Data Compression Conference.

SUMMARY OF INVENTION

Problem to be Solved by the Invention

However, in the technology described in Non-Patent Document 2, because cost evaluation has to be performed on each of a plurality of reference sample lines, a processing load on an encoding side increases in proportion to the number of reference sample lines. Also, the degree of freedom is low and there is a possibility that an appropriate reference sample line may not be able to be found in a scheme of selecting one from the plurality of reference sample lines.

The present invention has been made in view of such a problem and an objective of the present invention is to provide technology capable of improving the accuracy of intra-prediction and minimizing an increase in a processing load according to the improved accuracy of intra-prediction.

Means for Solving the Problem

An aspect of the present invention is a moving-image decoder. The moving-image decoder includes a decoding means configured to decode a bitstream representing a moving image including a block encoded using intra-prediction; an inverse processing means configured to generate difference values in pixels of the block by inverse-quantizing and inverse-transforming a level value of the block obtained from a result of decoding; an intra-prediction means configured to generate predicted values of pixels of the block according to intra-prediction based on pixel values of reconstructed blocks around the block; and a reconstruction means configured to reconstruct the block on the basis of the generated difference values and the generated predicted values. The intra-prediction means is configured to generate a reference line for use in the intra-prediction by synthesizing a plurality of lines of the reconstructed blocks around the block.

Another aspect of the present invention is a moving-image encoder. The moving-image encoder includes an intra-prediction means configured to generate predicted values of pixels of the block according to intra-prediction based on pixel values of encoded blocks around a block of a moving image; a difference generation means configured to generate difference values in pixels of the block on the basis of the generated predicted values; a processing means configured to transform and quantize the generated difference values and generate a level value; and an encoding means configured to generate a bitstream by encoding the generated level value. The intra-prediction means is configured to generate a reference line for use in the intra-prediction by synthesizing a plurality of lines of the encoded blocks around the block.

Also, any combination of the above components and mutual substitution of the components and expressions of the present invention between a device, a method, a system, a computer program, a recording medium in which the computer program is stored, and the like are valid as aspects of the present invention.

Advantageous Effects of Invention

According to the present invention, it is possible to improve the accuracy of intra-prediction and minimize an increase in a processing load according to the improved accuracy of intra-prediction.

BRIEF DESCRIPTION OF DRAWINGS

FIG. 8 is a data structure diagram showing an example of a checking result holding unit of FIG. 7.

DESCRIPTION OF EMBODIMENTS

Figure 1:
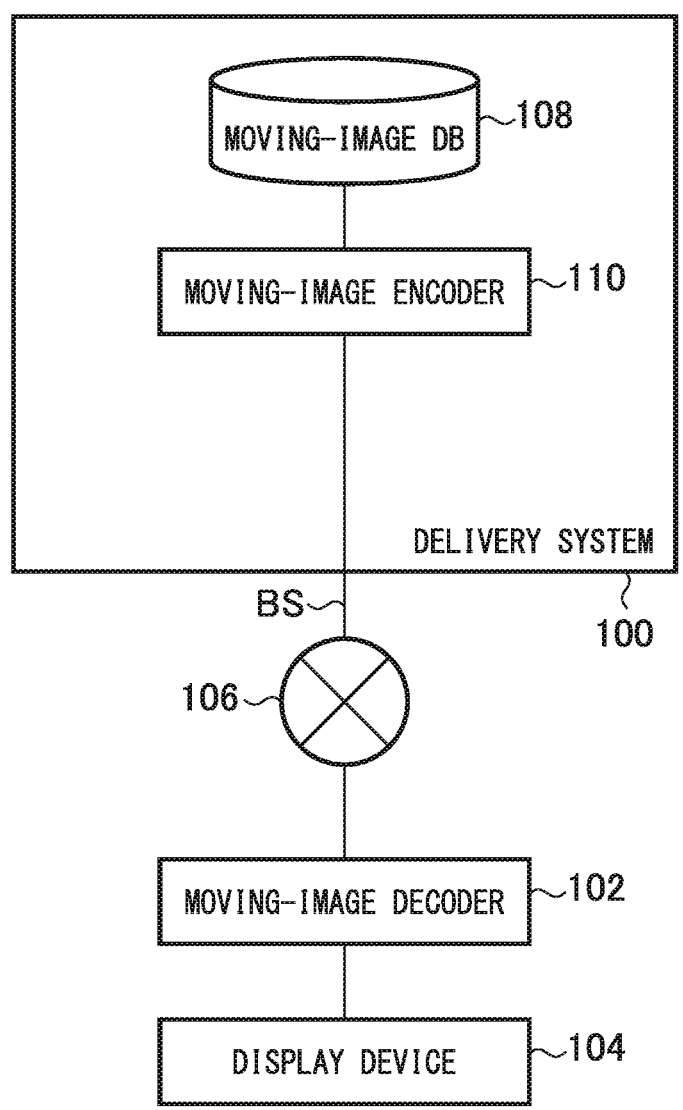
FIG. 1 is a schematic diagram showing a configuration of a delivery system according to a first embodiment.

Hereinafter, the same or similar components, members, and processing shown in the drawings are denoted by the same reference signs and overlapping description will be appropriately omitted. Also, some members that are unimportant for description are omitted in the drawings.

In the embodiment, in moving-image encoding/decoding (video encoding/decoding) adopting intra-prediction (intra-picture prediction), a new reference line is generated from a plurality of lines of blocks around an encoding/decoding target block and used for intra-prediction. Therefore, because it is possible to use a reference line reflecting information of more lines, the accuracy of intra-prediction can be improved.

Also, an identifier indicating whether a nearest line is used as a reference line as in a conventional method or whether a new reference line is generated on the encoding side, for example, a 1-bit flag, is generated and added to a bitstream. Therefore, an increase in a code amount by adopting the present embodiment is limited. Furthermore, because cost evaluation on the encoding side is performed between the generated reference line and the nearest line, it is possible to reduce a processing load on the encoding side as compared with a case in which cost evaluation is performed on each of a plurality of lines that are a source in which the reference line is generated.

First Embodiment

FIG. 1 is a schematic diagram showing a configuration of a delivery system 100 according to the first embodiment. The delivery system 100 is a system for use in a moving-image delivery service for delivering moving images. The moving-image delivery service may be, for example, video on demand (VOD). The delivery system 100 is connected to a moving-image decoder 102 such as a set-top box or a personal computer installed in a user site via a network 106 such as the Internet. The moving-image decoder 102 is connected to a display device 104 such as a television receiver or a monitor. The moving-image decoder 102 and the display device 104 may together constitute a portable terminal such as a smartphone.

Also, the delivery system in the moving-image delivery service is an example, and a technical idea according to the present embodiment can be applied to any system or service in which encoding or decoding of moving images are performed as will be apparent to those skilled in the art.

The delivery system 100 receives designation of moving-image content desired to be viewed by the user via the network 106. The delivery system 100 encodes data of the designated moving-image content to generate a bitstream BS. The delivery system 100 transmits the generated bitstream BS to the moving-image decoder 102 of a requesting user via the network 106. The moving-image decoder 102 decodes the received bitstream BS to generate moving-image data and transmits the moving-image data to the display device 104. The display device 104 processes the received moving-image data and outputs the designated moving-image content.

The delivery system 100 includes a moving-image database (DB) 108 and a moving-image encoder 110. The moving-image DB 108 holds data of moving images. The moving-image encoder 110 acquires moving-image data corresponding to the designated moving-image content from the moving-image DB 108, encodes the acquired moving-image data, and generates a bitstream BS.

Figure 2:
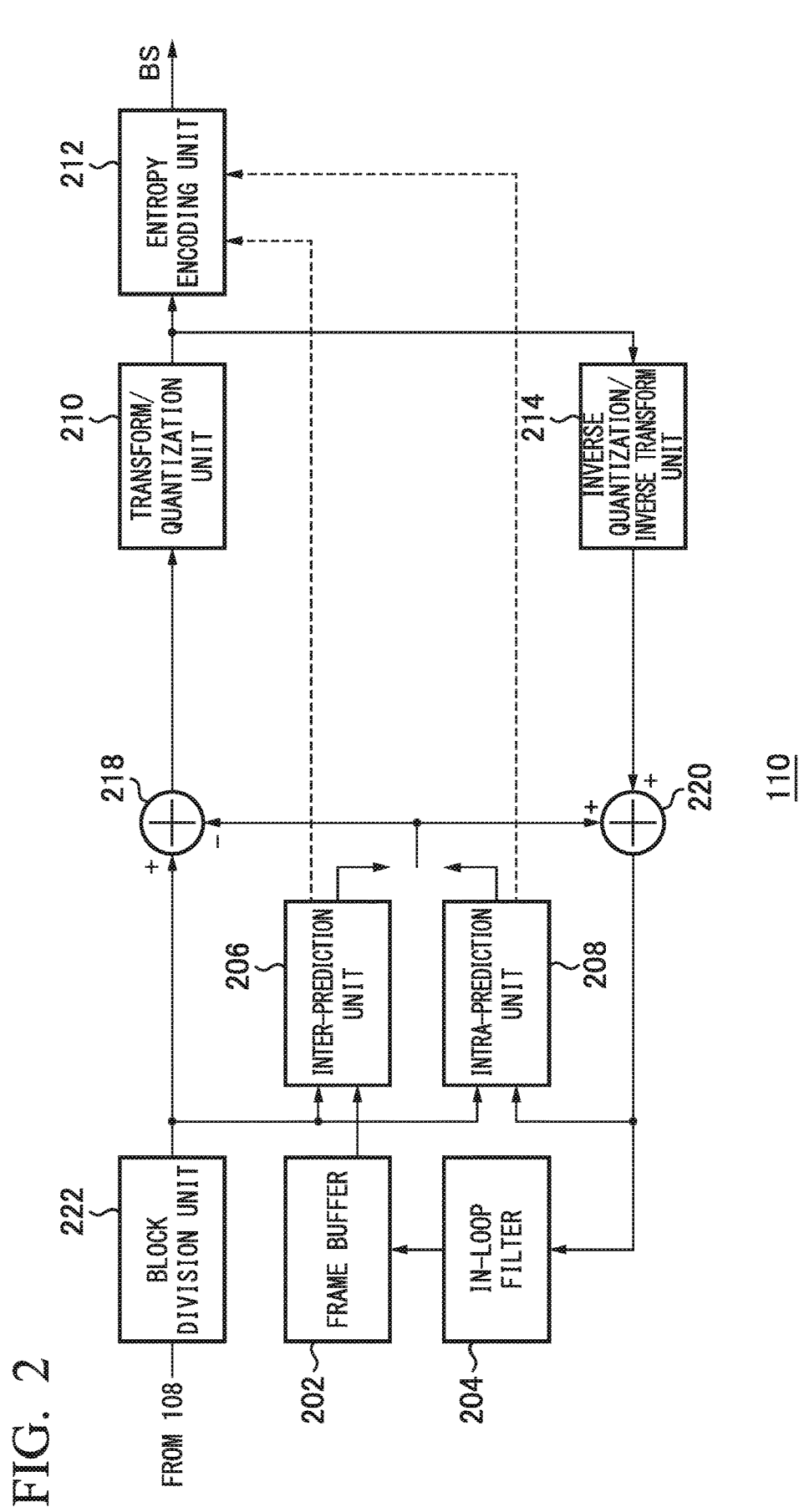
FIG. 2 is a block diagram showing a function and a configuration of a moving-image encoder of FIG. 1.

FIG. 2 is a block diagram showing a function and a configuration of the moving-image encoder 110 of FIG. 1. Although each block shown in the block diagram of the present specification can be implemented by an element including a CPU of a computer or a mechanical device as hardware and implemented by a computer program or the like as software, functional blocks implemented through cooperation thereof are depicted here. Therefore, it will be understood by those skilled in the art that these functional blocks can be implemented in various manners by a combination of hardware and software. A computer program for implementing the moving-image encoder 110 may be stored in a computer readable recording medium or distributed via a network.

The moving-image encoder 110 includes a frame buffer 202, an in-loop filter 204, an inter-prediction unit 206, an intra-prediction unit 208, a transform/quantization unit 210, an entropy encoding unit 212, an inverse quantization/inverse transform unit 214, a subtraction unit 218, an addition unit 220, and a block division unit 222.

The block division unit 222 divides an encoding target picture included in the moving-image data (video data) from the moving-image DB 108 into a plurality of blocks. The blocks have various sizes and the plurality of blocks have a quadruple tree structure. The division of the picture into the blocks in the block division unit 222 conforms to the division of the picture into blocks in high efficiency video coding (HEVC) (see Non-Patent Document 1). The block division unit 222 outputs a processing target block to the subtraction unit 218, the inter-prediction unit 206, and the intra-prediction unit 208.

A reference picture corresponding to the processing target block is input from the frame buffer 202 to the inter-prediction unit 206. The inter-prediction unit 206 outputs a motion-compensated image of the processing target block using inter-prediction (inter-picture prediction) on the basis of the input reference picture.

Image data of encoded blocks (blocks on which an encoding process has already been performed) around the processing target block are input from the addition unit 220 to the intra-prediction unit 208. The intra-prediction unit 208 generates and outputs predicted values of pixels of the processing target block using intra-prediction based on pixel values of the input encoded blocks. Here, the pixel value includes at least one of a luminance value and a chrominance value. Either the output of the inter-prediction unit 206 or the output of the intra-prediction unit 208 is output to the subtraction unit 218 in accordance with whether inter-prediction is applied to the processing target block or whether intra-prediction is applied to the processing target block.

The subtraction unit 218 performs subtraction between actual pixel values of pixels of the processing target block and corresponding predicted values generated in the inter-prediction or the intra-prediction and generates difference values in the pixels of the processing target block (predicted residue signals). The subtraction unit 218 outputs the generated difference values to the transform/quantization unit 210.

The transform/quantization unit 210 transforms (for example, orthogonally transforms) and quantizes the difference values in the pixels of the processing target block acquired from the subtraction unit 218 and generates a level value. The transform/quantization unit 210 outputs the generated level value to the entropy encoding unit 212 and the inverse quantization/inverse transform unit 214.

The entropy encoding unit 212 performs entropy encoding on the level value generated by the transform/quantization unit 210 and side information acquired from the inter-prediction unit 206 or the intra-prediction unit 208 and generates a bitstream BS.

Also, the side information is information necessary for reconstructing pixel values for use in the decoder and includes related information such as a prediction mode indicating which of intra-prediction and inter-prediction has been used, a reference flag indicating whether or not a reference line has been generated in the intra-prediction, motion information in the inter-prediction, a quantization parameter, and a block size. As the prediction mode indicating the intra-prediction, 35 types of intra-prediction modes defined in HEVC are adopted. The 35 types of intra-prediction modes include a planar mode, a DC mode, and 33 types of directional modes. The 33 types of directional modes have different prediction directions. The reference flag indicates that the reference line has been generated when the reference flag is "1" and indicates that no reference line has been generated when the reference flag is "0".

The inverse quantization/inverse transformation unit 214 performs a process opposite to the process of the transform/quantization unit 210 to generate difference values in pixels of the processing target block.

The addition unit 220 reconstructs pixel values of the pixels of the processing target block by summing the difference values output from the inverse quantization/inverse transform unit 214 and the corresponding predicted values generated in inter-prediction or intra-prediction. The addition unit 220 outputs a reconstructed block to the intra-prediction unit 208 and the in-loop filter 204.

The in-loop filter 204 generates a locally decoded image corresponding to a processing target frame and outputs the locally decoded image to the frame buffer 202. The frame buffer 202 holds the locally decoded image. The locally decoded image is used for the inter-prediction in the inter-prediction unit 206.

The intra-prediction unit 208 will be described in more detail.

The intra-prediction unit 208 generates a reference line for use in intra-prediction by synthesizing a plurality of lines of encoded blocks around the processing target block. A line is a column of pixels arranged in a predetermined direction and may have a width of one pixel or a width of two or more pixels. The length of the line may be the number of pixels arranged in the predetermined direction. The reference line is a column of pixels that are referred, i.e., reference pixels, to in intra-prediction. Although the generated reference line is basically a new line which is different from any of a plurality of lines which are a source of generation, there is a possibility that a reference line to be generated will be the same as any of the plurality of lines by chance, according to pixel values of pixels of lines or a synthesis method.

Figure 3:
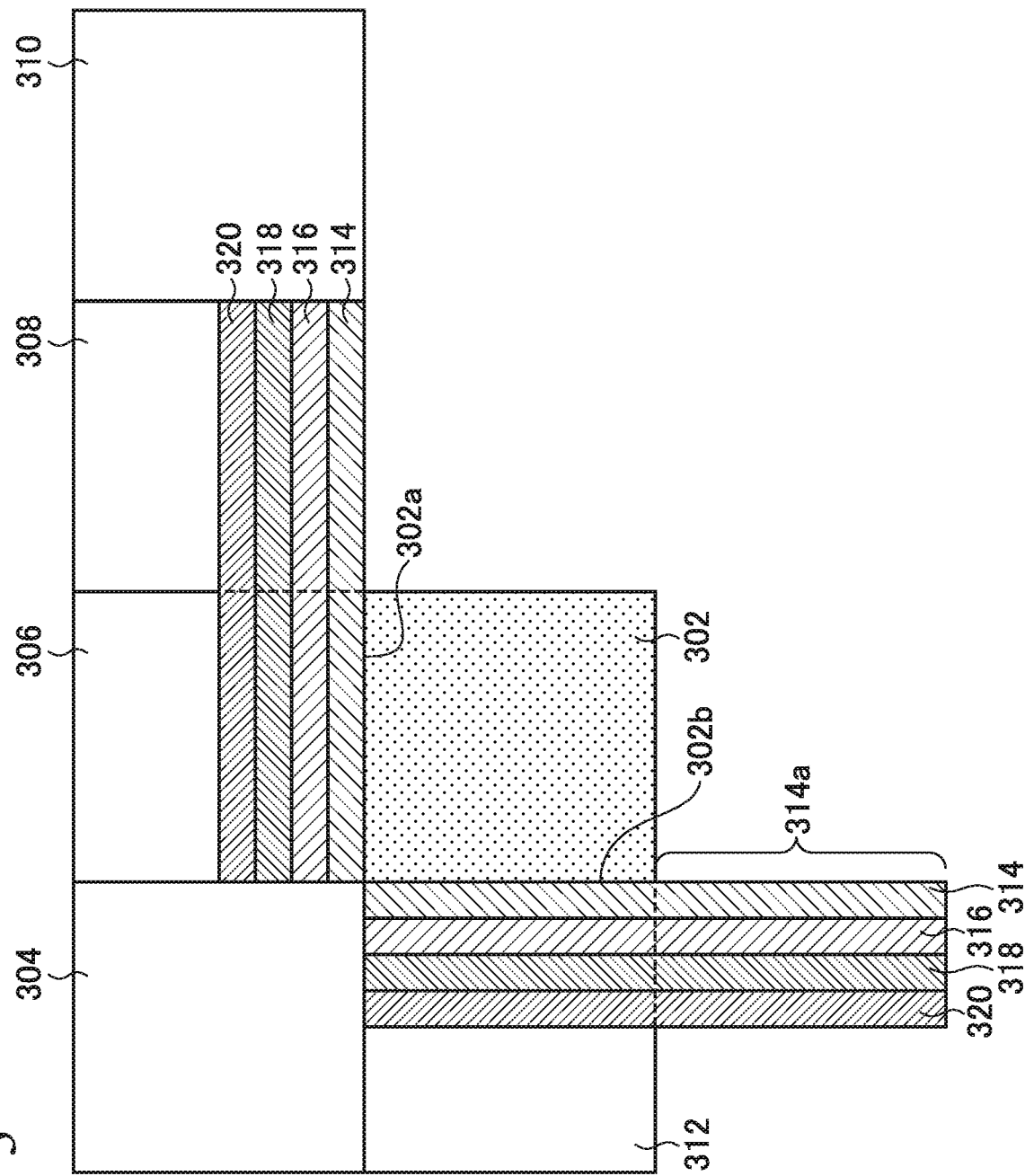
FIG. 3 is a schematic diagram showing a processing target block and a plurality of encoded blocks around the processing target block.

FIG. 3 is a schematic diagram showing a processing target block 302 and a plurality of encoded blocks 304, 306, 308, 310, and 312 around the processing target block 302. A picture is encoded in a zigzag manner in a horizontal direction from a top left block. Therefore, there are a second encoded block 306 in contact with the top of the processing target block 302, a fifth encoded block 312 in contact with the left of the processing target block 302, a first encoded block 304 in contact with the left of the second encoded block 306, a third encoded block 308 in contact with the right of the second encoded block 306, and a fourth encoded block 310 in contact with the right of the third encoded block 308 around the processing target block 302.

A line in contact with an upper boundary 302a and a left boundary 302b of the processing target block 302 is referred to as a first/nearest line 314. Lines defined on a side opposite to the processing target block 302 of the first/nearest line 314 are sequentially referred to as a second line 316, a third line 318, a fourth line 320, and the like. Although a horizontal part of the first/nearest line 314 is included in the encoded block in an example shown in FIG. 3, a part 314a of a vertical portion protrudes from the encoded block. The pixel value of a pixel of the protrusion part 314a is constructed by duplicating the pixel value of a pixel immediately before protrusion. The same applies to the other lines 316, 318, and 320.

Figure 4:
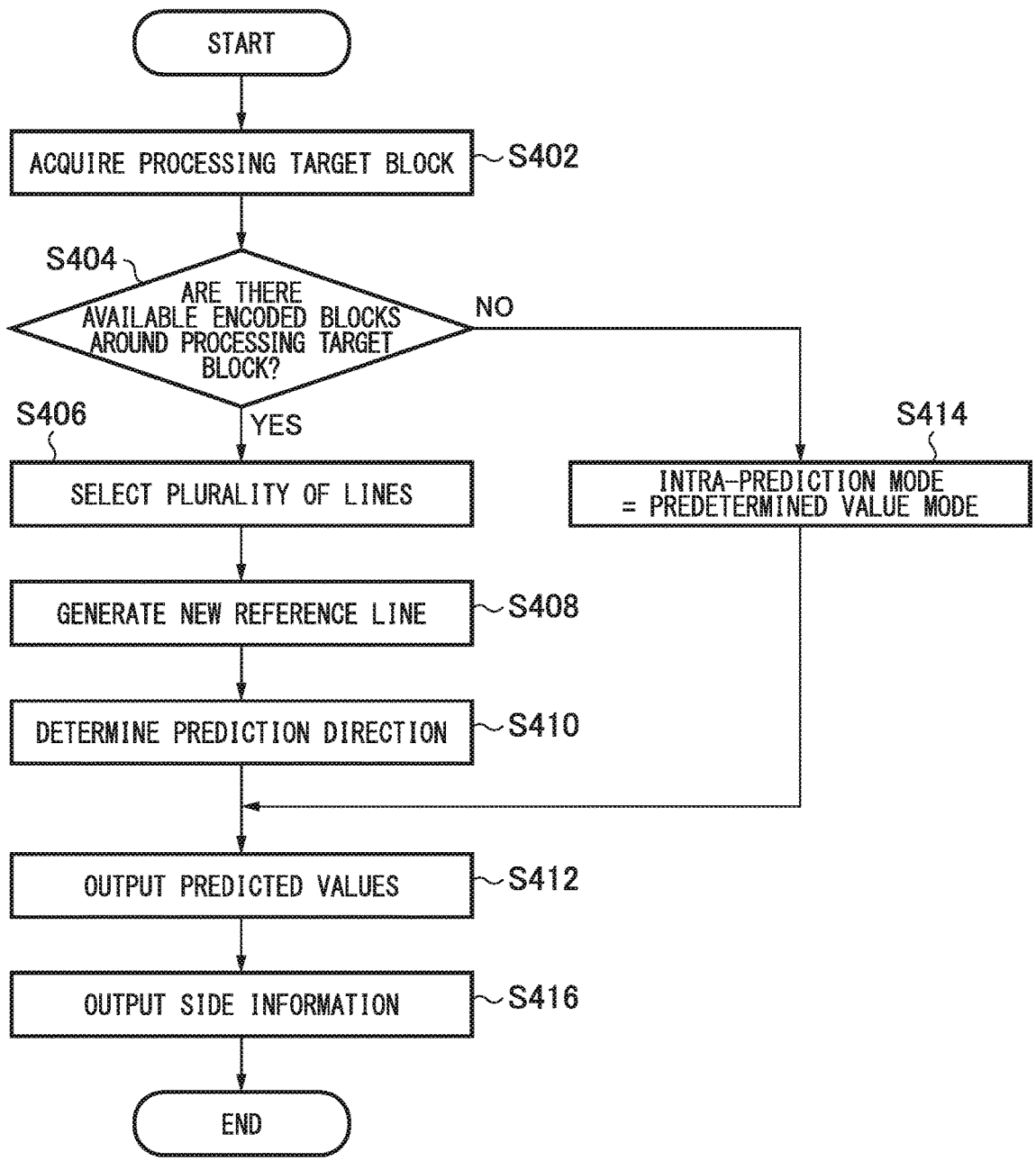
FIG. 4 is a flowchart showing a flow of a series of processing steps in an intra-prediction unit of FIG. 2.

FIG. 4 is a flowchart showing a flow of a series of processing steps in the intra-prediction unit 208 of FIG. 2. The intra-prediction unit 208 acquires a processing target block from the block division unit 222 (S402). The intra-prediction unit 208 determines whether or not there are encoded blocks available around the acquired processing target block (S404). If it is determined that there are encoded blocks available around the acquired processing target block (Y in S404), the intra-prediction unit 208 selects a plurality of lines, for example, K (K is a natural number greater than or equal to 2) lines, from the available encoded blocks (S406). In the example of FIG. 3, four lines from the first/nearest line 314 to the fourth line 320 may be selected. The intra-prediction unit 208 synthesizes the K selected lines to generate a new reference line (S408). For example, the synthesis of the K lines may be a linear combination of K lines defined by the following Equation 1.

[Math. 1]

$$A_{new} = \qquad \text{(Equation 1)}$$
$$a_1 A(1, :) + a_2 A(2, :) + \ldots + a_K A(K, :) = \sum_{k=1}^{K} a_k A(k, :)$$

Here, $A_{new}$ denotes a new reference line, and $A(1, :), \ldots, A(K, :)$ denote the first/nearest line 314, ..., a $K^{th}$ line. $a_1, \ldots,$ denote linear combination coefficients.

Also, a value of K in step S406, a rule for line selection, and values of $a_1, \ldots, a_K$ are predetermined and given to the intra-prediction unit 208 and the intra-prediction unit of the corresponding moving-image decoder 102. That is, basically, the same reference line is generated in intra-prediction on the encoding side and intra-prediction on the decoding side for the same processing target block.

The intra-prediction unit 208 determines a prediction direction on the basis of the generated new reference line $A_{new}$ and pixel values of pixels of the acquired processing target block (S410). The infra-prediction unit 208 may calculate a cost for each of possible prediction directions and identify a prediction direction in which the calculated cost is minimized. The intra-prediction unit 208 generates and outputs predicted values of the pixels of the processing target block on the basis of the generated new reference line $A_{new}$ and the determined prediction direction (S412). The intra-prediction unit 208 generates side information including the reference flag="1" and the prediction mode="intra-prediction mode corresponding to the determined prediction direction" and outputs the side information to the entropy encoding unit 212 (S416).

If it is determined that there is no available encoded block in step S404 (N in S404), the intra-prediction unit 208 sets an intra-prediction mode to a predetermined value mode in which a DC value is adopted for all reference samples (S414). The intra-prediction unit 208 replaces all pixel values of pixels of the reference line with DC values (DC_value), i.e., $2^{N-1}$. N is a sampling bit depth and may be 8. If N is 10 or more, higher resolution can be realized. The intra-prediction unit 208 generates and outputs predicted values of the pixels of the processing target block on the basis of the reference line of the predetermined value mode (S412). The intra-prediction unit 208 generates side information including the reference flag="0" and the prediction mode="predetermined value mode", and outputs the side information to the entropy encoding unit 212 (S416). Whether a new reference line is generated or a predetermined value mode is used is determined according to a determination result in step S404. Thus, it can be said that it is determined whether or not to generate a reference line for use in intra-prediction from a plurality of lines in step S404.

Figure 5:
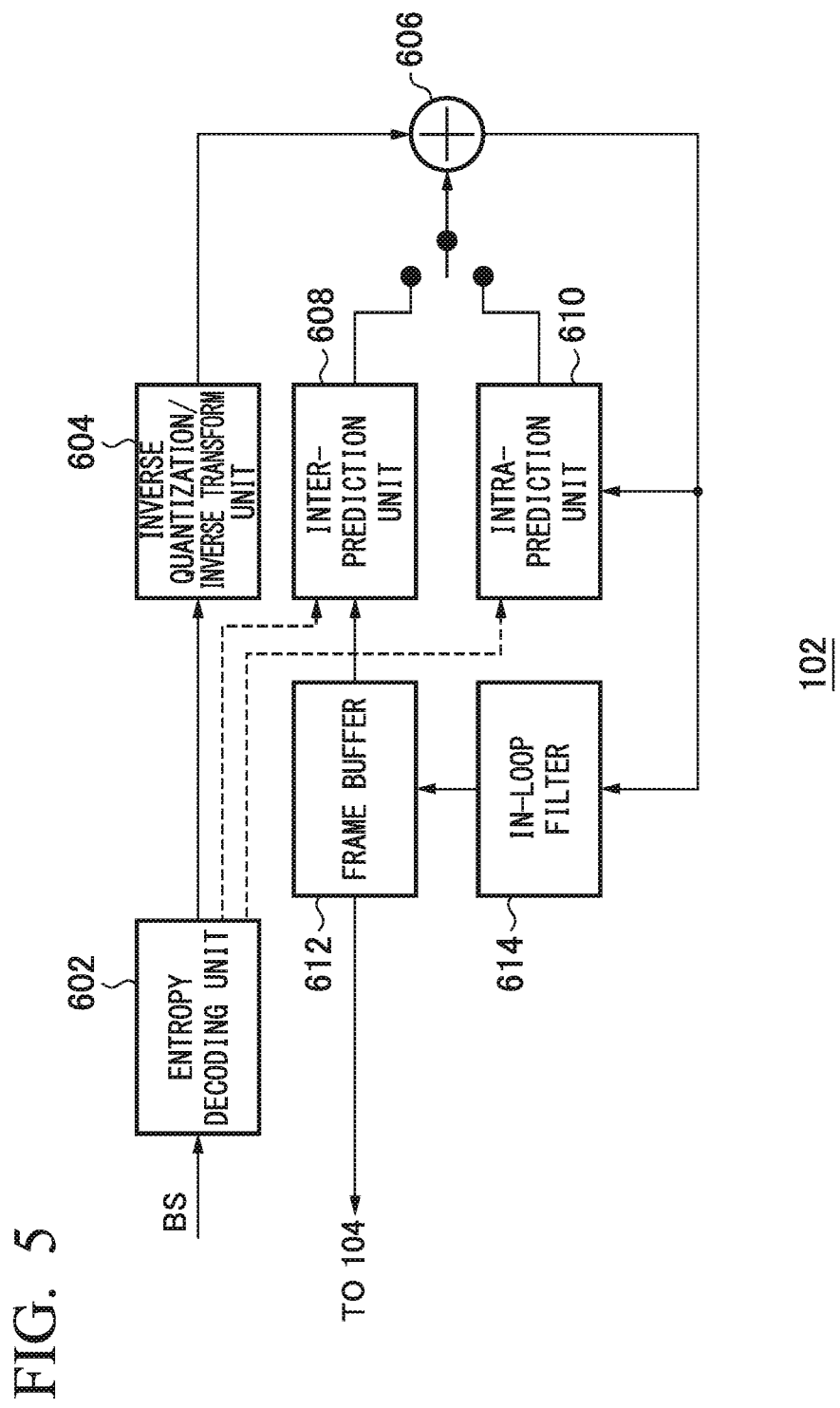
FIG. 5 is a block diagram showing a function and a configuration of a moving-image decoder of FIG. 1.

FIG. 5 is a block diagram showing a function and a configuration of the moving-image decoder 102 in FIG. 1. The moving-image decoder 102 includes an entropy decoding unit 602, an inverse quantization inverse transform unit 604, an addition unit 606, an inter-prediction unit 608, an intra-prediction unit 610, a frame buffer 612, and an in-loop filter 614. Basically, the moving-image decoder 102 obtains output moving-image data from a bitstream BS in a procedure opposite to that performed by the moving-image encoder 110.

The entropy decoding unit 602 receives the bitstream BS from the delivery system 100 via the network 106. The entropy decoding unit 602 performs entropy decoding on the received bitstream and extracts a level value and side information. A process of obtaining the side information and the level value from the bitstream is referred to as a parse process. Reconstruction of pixel values using the side information and the level value obtained as described above is referred to as a decoding process.

The inverse quantization/inverse transformation unit 604 inversely quantizes and inversely transforms the level value of a processing target block to generate difference values in pixels of the processing target block.

The addition unit 606 acquires predicted values generated by the inter-prediction unit 608 or the intra-prediction unit 610 in accordance with whether the processing target block is intra-predicted or inter-predicted. The addition unit 606 reconstructs pixel values of pixels of the processing target block by summing the difference values generated by the inverse quantization/inverse transform unit 604 and the acquired corresponding predicted values. The addition unit 606 outputs a reconstructed processing target block to the intra-prediction unit 610 and the in-loop filter 614.

A reference picture corresponding to the processing target block is input from the frame buffer 612 to the inter-prediction unit 608. The inter-prediction unit 608 outputs a motion-compensated image of the processing target block according to inter-prediction on the basis of the input reference picture.

Image data of reconstructed blocks (already decoded blocks or already reconstructed blocks) around the processing target block is input from the addition unit 606 to the intra-prediction unit 610. The intra-prediction unit 610 generates and outputs the predicted values of the pixels of the processing target block according to intra-prediction based on input pixel values of the reconstructed block.

The in-loop filter 614 is, for example, a deblocking filter. The in-loop filter 614 generates a locally decoded image corresponding to a frame to be processed and outputs the locally decoded image to the frame buffer 612. The locally decoded image is used for inter-prediction in the inter-prediction unit 608 and simultaneously is output to the display device 104 as output moving-image data.

The intra-prediction unit 610 will be described in more detail.

Figure 6:
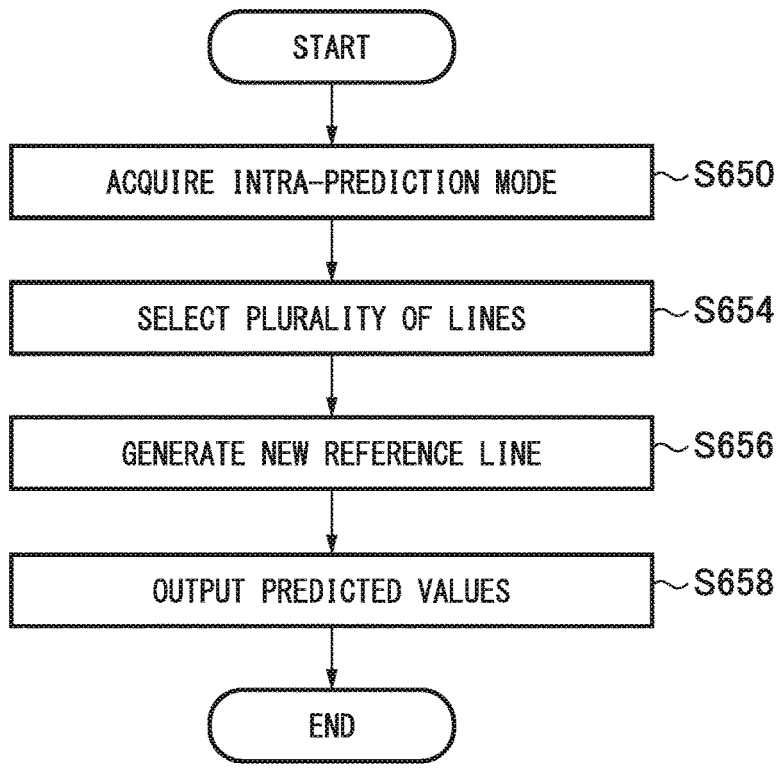
FIG. 6 is a flowchart showing a flow of a series of processing steps in an intra-prediction unit of the moving-image decoder shown in FIG. 5.

FIG. 6 is a flowchart showing a flow of a series of processing steps in the intra-prediction unit 610. The intra-prediction unit 610 acquires an intra-prediction mode for a processing target block from side information extracted by the entropy decoding unit 602 (S650). The intra-prediction unit 610 selects a plurality of lines from a reconstructed block as in steps S406 and S408 of FIG. 4 (S654) and generates a new reference line from the plurality of selected lines (S656). The intra-prediction unit 610 generates and outputs predicted values of pixels of the processing target block on the basis of the generated new reference line and a prediction direction indicated by the intra-prediction mode acquired in step S650 (S658).

Also, if there is no reconstructed block available in step S654, the intra-prediction unit 610 replaces all pixel values of pixels of the reference line with DC values (DC_value), i.e., $2^{N-1}$.

According to the delivery system 100 according to the present embodiment, it is possible to generate a reference line from a plurality of lines of encoded/reconstructed blocks in the intra-prediction of each of the encoding side and the decoding side. Therefore, because a reference line including more information of blocks around the processing target block is implemented, the accuracy of intra-prediction can be improved.

Also, in the present embodiment, a 1-bit reference flag indicating whether or not a reference line has been generated on the encoding side is generated and included in a bitstream, and the decoding side determines whether or not to generate a reference line on the basis of the reference flag. On the other hand, when a reference line is selected from a plurality of lines of blocks around the processing target block, it is necessary to include an index (normally 2 bits or more) of the selected line in the bitstream. Therefore, an increase in a code amount by adopting a technique of the present embodiment is minimized as compared with a case in which the reference line is selected.

Although a case in which it is indicated whether or not to generate a new reference line using the reference flag has been described in the present embodiment, the present invention is not limited thereto. For example, instead of using the reference flag, it may be determined whether or not to generate a new reference line on the basis of whether or not the intra-prediction mode is a predetermined value mode.

In the present embodiment, linear combination coefficients $a_1, \ldots, a_K$ may be determined in consideration of complexity of both the encoding side and the decoding side. For example, the linear combination coefficients may be determined as in $a_1 > a_2 > \ldots > a_K$ so that an influence decreases as a distance from the processing target block increases. Alternatively, if occlusion occurs near the nearest line, a line away from the processing target block can be more appropriate. In this case, the coefficient may be determined to be inversely proportional to a distance between the line and the processing target block. For example, $a_1$, $a_2$, and $a_3$ may be determined to be $3/16$, $5/16$, and $8/16$ respectively.

Second Embodiment

In the first embodiment, a case in which the linear combination shown in Equation 1 is used when a new reference line is generated in intra-prediction has been described. In a second embodiment, a plurality of lines for generating a new reference line are determined using a prediction direction. Thereby, the new reference line to be generated includes more valid information, and more accurate intra-prediction becomes possible.

Figure 7:
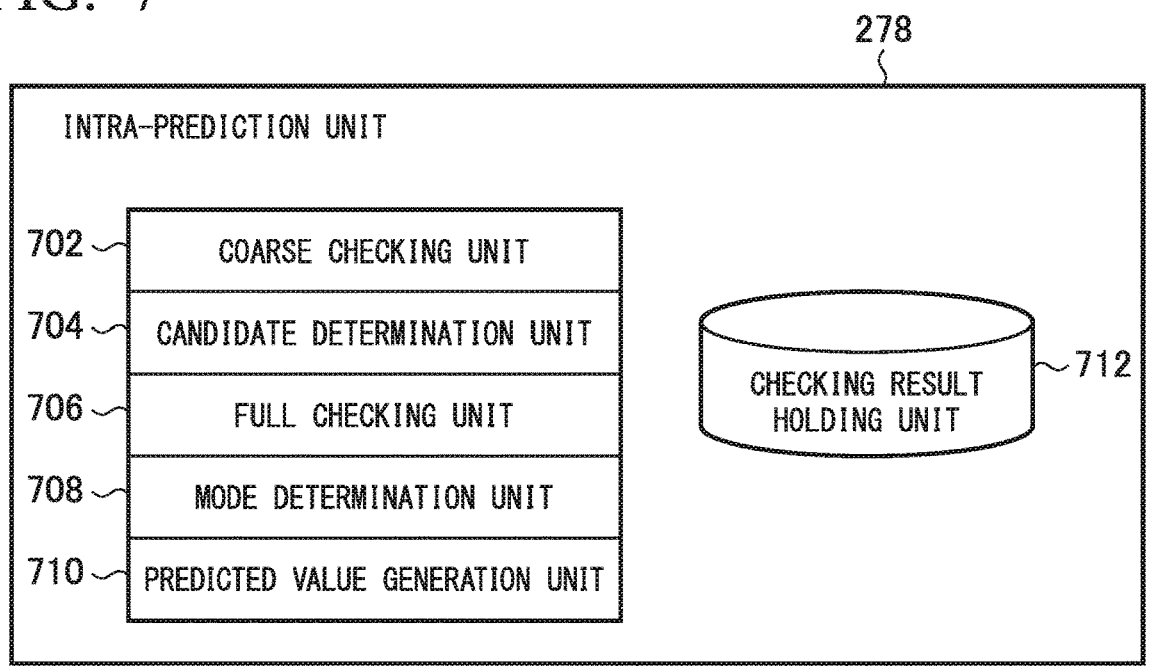
FIG. 7 is a block diagram showing a function and a configuration of an intra-prediction unit according to a second embodiment.

A configuration of a moving-image encoder according to the present embodiment conforms to the configuration of the moving-image encoder 110 shown in FIG. 2, except for an intra-prediction unit. FIG. 7 is a block diagram showing a function and a configuration of an intra-prediction unit 278 according to the second embodiment. The intra-prediction unit 278 includes a coarse checking unit 702, a candidate determination unit 704, a full checking unit 706, a mode determination unit 708, a predicted value generation unit 710, and a checking result holding unit 712.

In accordance with a first cost calculation method, the coarse checking unit 702 calculates coarse checking costs of 33 types of directional modes for a processing target block. The first cost calculation method has lower cost accuracy than a second cost calculation method to be described below but has a smaller processing load than the second cost calculation method. The first cost calculation method may be, for example, a rough mode decision (RMD) described in Non-Patent Document 3. The coarse checking unit 702 registers the calculated coarse checking costs in the checking result holding unit 712.

The candidate determination unit 704 refers to the checking result holding unit 712 and determines L (L is a natural number greater than or equal to 2 and less than or equal to 32) candidate directional modes from among the 33 types of directional modes. The candidate determination unit 704 may determine L directional modes as the candidate directional modes in ascending order of coarse checking cost.

In accordance with the second cost calculation method, the full checking unit 706 calculates full checking costs of the L candidate directional modes determined by the candidate determination unit 704. The second cost calculation method may be, for example, rate-distortion optimization described in Non-Patent Document 4. In this case, the full checking cost is a rate-distortion cost (an R-D cost). For each of the candidate directional modes, the full checking unit 706 separately calculates R-D costs in a case in which a new reference line is used and a case in which a nearest line is used as a reference line. The full checking unit 706 registers the calculated R-D costs in the checking result holding unit 712.

The mode determination unit 708 refers to the checking result holding unit 712 and determines one combination from among combinations of the L candidate directional modes and generation/non-generation of a reference line. The mode determination unit 708 may determine a combination having a smallest R-D cost.

The predicted value generation unit 710 generates predicted values of pixels of the processing target block from encoded blocks around the processing target block on the basis of the combination determined by the mode determination unit 708.

FIG. 8 is a data structure diagram showing an example of the checking result holding unit 712. The checking result holding unit 712 holds information indicating whether a reference line is a line is a nearest line or generated line, a type of intra-prediction mode, a coarse checking cost, information indicating whether it was made a candidate, and an R-D cost in association.

Figure 9:
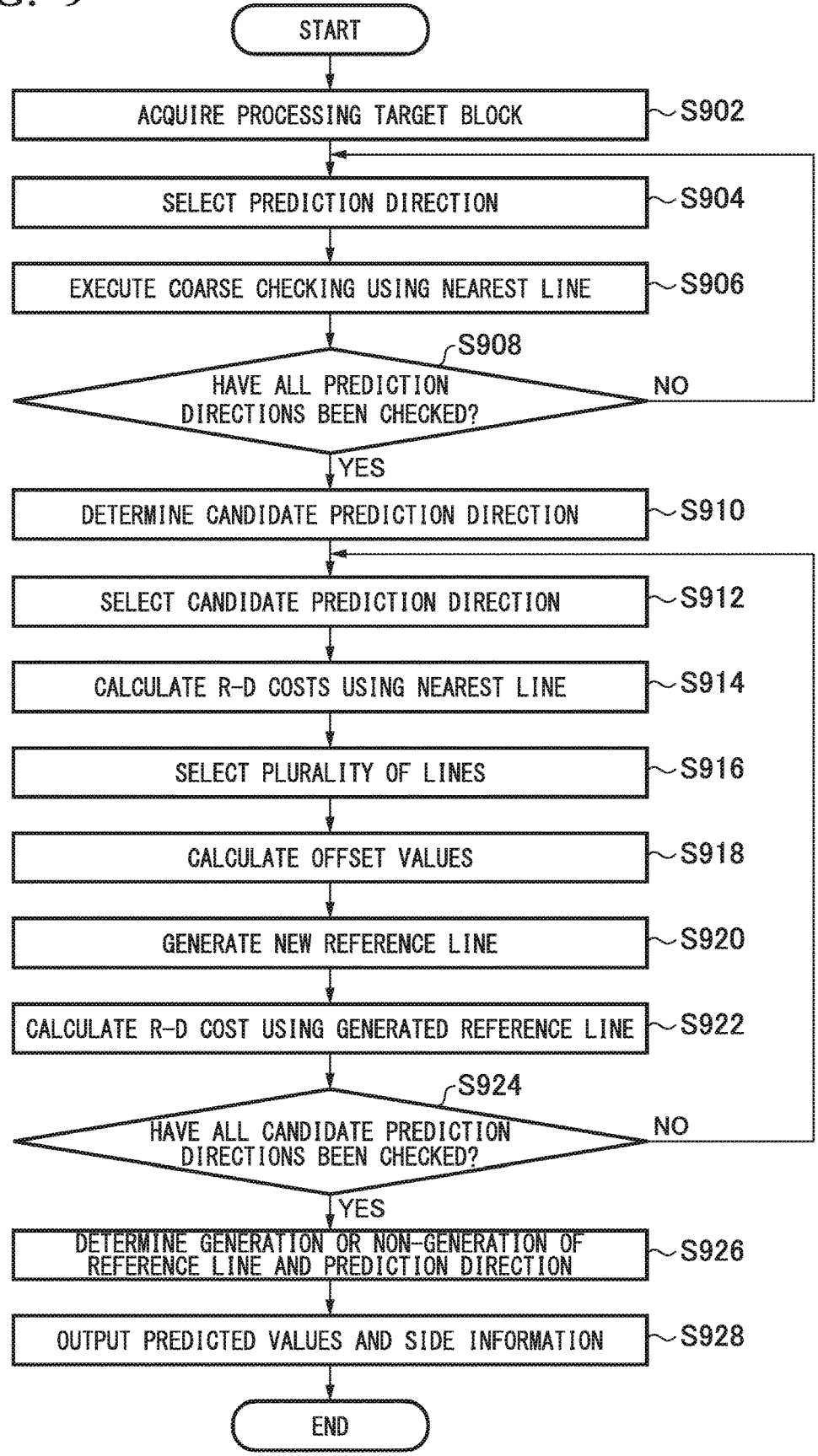
FIG. 9 is a flowchart showing a flow of a series of processing steps in the intra-prediction unit of FIG. 7.

FIG. 9 is a flowchart showing the flow of a series of processing steps in the intra-prediction unit 278 of FIG. 7. The intra-prediction unit 278 acquires a processing target block from the block division unit (S902). The coarse checking unit 702 selects a prediction direction that has not yet been selected from 33 types of prediction directions (S904). The coarse checking unit 702 executes coarse checking, in the selected prediction direction, using a nearest line of encoded blocks around the processing target block (S906). When there is a prediction direction that has not been checked (N in S908), the process returns to step S904. When all the prediction directions have been checked (Y in S908), the candidate determination unit 704 determines L candidate prediction directions on the basis of coarse checking costs (S910).

The full checking unit 706 selects a candidate prediction direction that has not yet been selected from among the L candidate prediction directions (S912). The full checking unit 706 calculates R-D costs using a nearest line of the encoded blocks around the processing target block in the selected candidate prediction direction (S914). The full checking unit 706 selects K lines from the encoded blocks (S916). For each selected lines, the full checking unit 706 calculates offset values $\beta_1, \ldots, \beta_K$ on the basis of the selected candidate prediction direction (S918). The offset values $\beta_1, \ldots, \beta_K$ can take a positive or negative value.

Figure 10:
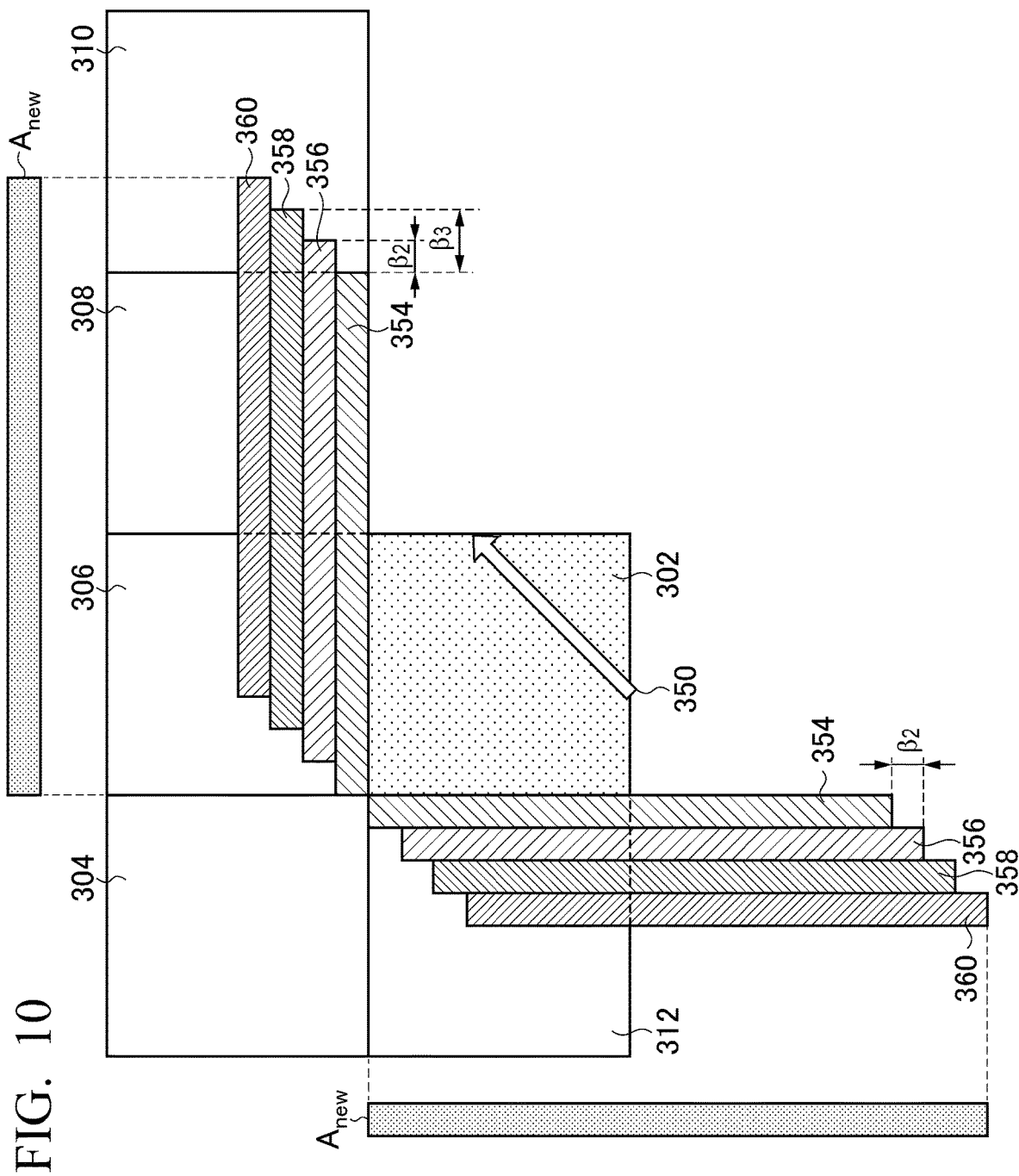
FIG. 10 is a schematic diagram showing an offset of a line.

FIG. 10 is a schematic diagram showing a line offset. Each line is offset along a direction in which the line extends. An offset value thereof is an amount according to a candidate prediction direction 350 selected in step S912. In an example shown in FIG. 10, a first/nearest line 354 is not offset and therefore its offset value $\beta_1$ is zero. A horizontal portion of a second line 356 is offset rightward in a horizontal direction by the offset value $\beta_2$ and a vertical portion thereof is offset downward in a vertical direction by the offset value $\beta_2$. Also, even for the same line, a horizontal offset value and a vertical offset value may be different depending on a candidate prediction direction. Offset values of a third line 358 and a fourth line 360 are similar to that of the second line 356.

Figure 11A:
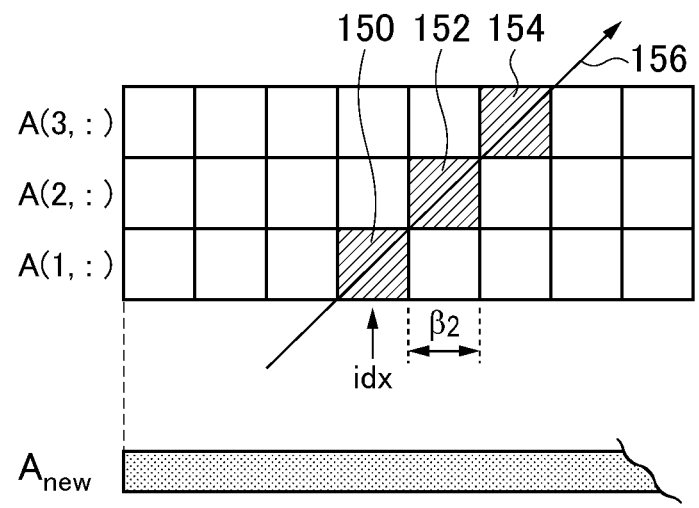
FIG. 11A is a schematic diagram showing a case in which an offset value is an integer.
Figure 11B:
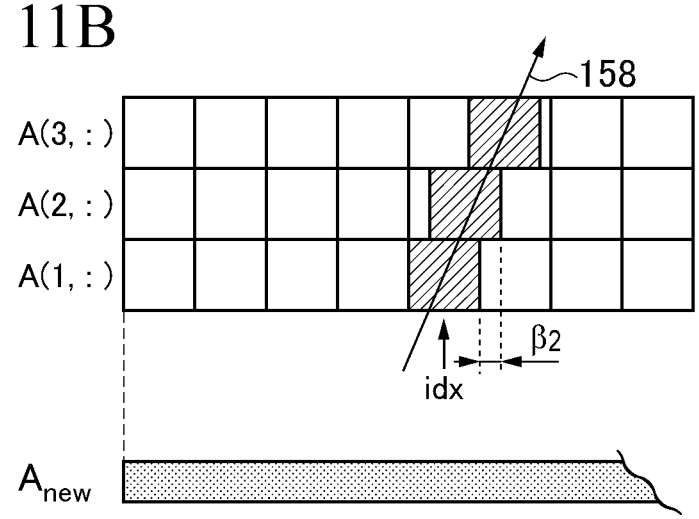
FIG. 11B is a schematic diagram showing a case in which an offset value is a fraction.

FIGS. 11A and 11B are schematic diagrams showing a case in which the offset value is an integer and a case in which the offset value is a fraction. Units of the offset values $\beta_1, \ldots, \beta_K$ are indices, not constants. For example, $\beta_3=2\beta_2$. FIG. 11A shows a case in which the offset value $\beta_2$ according to a candidate prediction direction 156 is an integer, for example, 1. A pixel value of a new reference line $A_{new}$ in an index idx of the horizontal direction is a weighted linear sum of a pixel value of a pixel 150 in an index idx of a first/nearest line 314 (A(1, :)), a pixel value of a pixel 152 in an index idx+$\beta_2$ of a second line 316 (A(2, :)) and a pixel value of a pixel 154 in an index idx=$2\beta_2$ of a third line 318 (A(3, :)). A line A'(k, :) obtained by offsetting a $k^{th}$ line A (k, :) as shown in FIG. 11A is represented as follows.

[Math. 2]

$$A'(1, :) = A(1, :)$$
$$A'(2, idx) = A(2, idx + \beta)$$
$$A'(3, idx) = A(3, idx + 2\beta)$$
$$\ldots$$
$$A'(K, idx) = A(K, idx + (K-1)\beta)$$

Here, $\beta = \beta_2$.

When the offset value is a fraction, interpolation of pixel values of two adjacent pixels is used. FIG. 11B shows a case in which the offset value $\beta_2$ according to a candidate prediction direction 158 is a fraction. The line A'(k, :) obtained by offsetting the $k^{th}$ line A(k, :) as shown in FIG. 11B is represented as follows.

[Math. 3]

$$A'(1, :) = A(1, :)$$
$$A'(2, idx) = \alpha * A(2, idx - 1) + (1 - \alpha) * A(2, idx) \text{ or}$$
$$A'(2, idx) = \alpha * A(2, idx) + (1 - \alpha) * A(2, idx + 1)$$
$$\ldots$$

Whether an upper row or a lower row is used as an equation representing A'(2, idx) depends on an angle of the candidate prediction direction. $\alpha$ is a ratio of a portion where A'(k, idx) and A(k, idx) overlap.

Returning to FIG. 9, the full checking unit 706 generates a new reference line $A_{new}$ by synthesizing the K lines offset by the calculated offset values $\beta_1, \ldots, \beta_K$ (S920). The synthesis of the K offset lines may be a linear combination of K lines defined by, for example, the following Equation 2.

[Math. 4]

$$A_{new} = a_1 A'(1, :) + a_2 A'(2, :) + \ldots + a_K A'(K, :) = \sum_{k=1}^{K} a_k A'(k, :)$$ (Equation 2)

The full checking unit 706 calculates an R-D cost using the new reference line generated in step S920 in the candidate prediction direction selected in step S912 (S922). If there is a candidate prediction direction that has not yet been fully checked (N in S924), the process returns to step S912. When all the candidate prediction directions have been fully checked (Y in S924), the mode determination unit 708 identifies a set, in Which an R-D cost is minimized, of a candidate prediction direction and a nearest line/generated line (S926). The predicted value generation unit 710 generates and outputs predicted values of pixels of the processing target block on the basis of the identified reference line (a nearest line or a newly generated reference line) and the prediction direction (S928). The predicted value generation unit 710 generates side information indicating a result of determination in step S926 and outputs the side information to the entropy encoding unit (S928).

The configuration of the moving-image decoder according to the present embodiment conforms to the configuration of the moving-image decoder 102 shown in FIG. 5, except for an intra-prediction unit. A main difference between the flow of processing in the intra-prediction unit on the decoding side according to the present embodiment and a flow of processing shown in FIG. 6 is that a nearest line is set as a reference line when the reference flag is "0" and that each line of a synthesis source is offset in accordance with a prediction direction when a new reference line is generated in the present embodiment.

Figure 12:
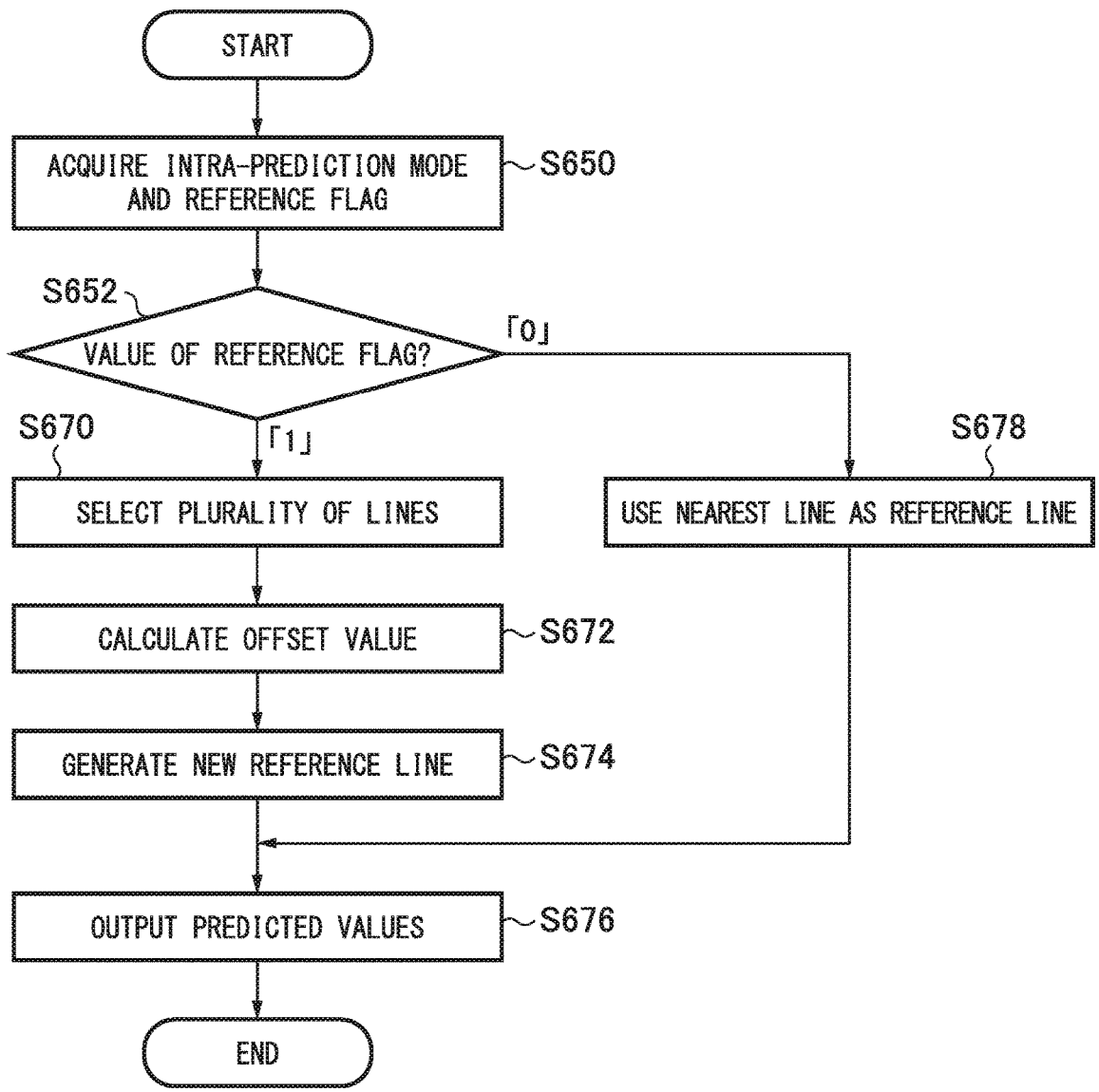
FIG. 12 is a flowchart showing a flow of a series of processing steps in a decoding-step intra-prediction unit according to the second embodiment.

FIG. 12 is a flowchart showing a flow of a series of processing steps in the intra-prediction unit on the decoding side according to the second embodiment. When a value of a reference flag acquired in step S650 is "1" ("1" in S652), the intra-prediction unit selects a plurality of lines (S670), calculates an offset value of each line on the basis of a prediction direction indicated by an intra-prediction mode acquired in step S650 (S672), and generates a new reference line from a plurality of offset lines (S674) as in steps S916, S918, and S920 of FIG. 9. The intra-prediction unit generates and outputs predicted values of pixels of the processing target block on the basis of the generated new reference line and the predicted direction (S676).

When the value of the reference flag acquired in step S652 is "0" ("0" in S652), the intra-prediction unit uses a nearest line of reconstructed blocks around the processing target block as a reference line (S678). The intra-prediction unit generates and outputs predicted values of pixels of the processing target block on the basis of the nearest line and the prediction direction (S676). Whether a new reference line is generated or the nearest line is used as a reference line is determined according to a determination result in step S652. Therefore, it can be said that it is determined whether or not to generate a reference line for use in intra-prediction from a plurality of lines in step S652.

The moving-image encoder and the moving-image decoder according to the present embodiment have actions and effects similar to those according to the first embodiment. In addition, because the synthesis source line is offset in accordance with the prediction direction, intra-prediction using a new reference line obtained through synthesis can generate a more accurate predicted value.

Although a case in which the nearest line is used during coarse checking has been described in the present embodiment, there present invention is not limited thereto and a new reference line may be generated from a plurality of lines offset for coarse checking.

Although a case in which a nearest line is used as a reference line when no new reference line is generated has been described in the present embodiment, the present invention is not limited thereto and a predetermined line other than the nearest line, for example, a second line or a third line, may be used as the reference line.

Third Embodiment

In the first and second embodiments, a case in which values of $a_1, \ldots, a_K$ are predetermined and given in advance to the intra-prediction unit on each of the encoding side and the decoding side has been described. In the third embodiment, the coefficients $a_1, \ldots, a_K$ are adaptively determined.

Figure 13:
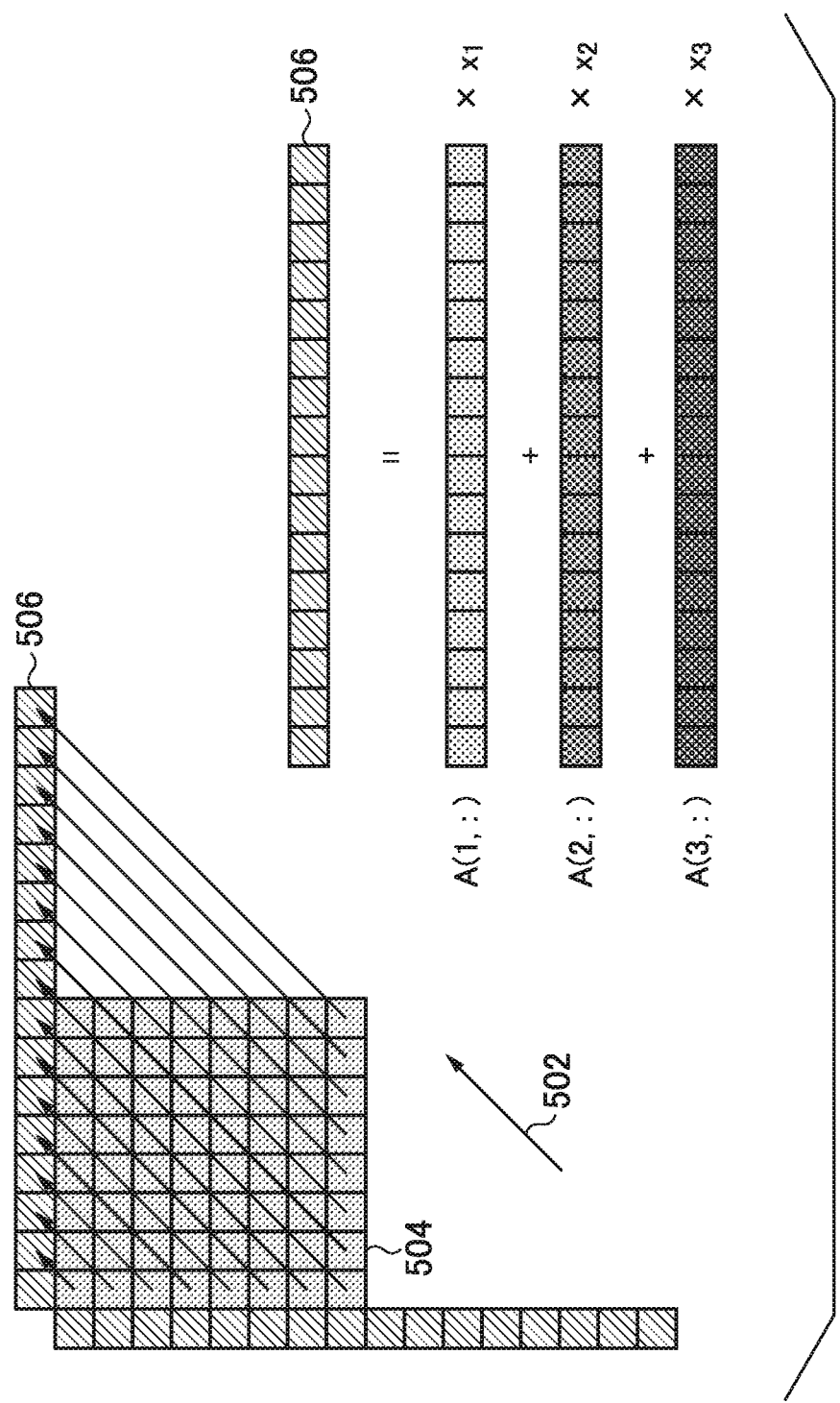
FIG. 13 is a schematic diagram showing the determination of an adaptive linear combination coefficient.

FIG. 13 is a schematic diagram showing a determination of an adaptive linear combination coefficient. The intra-prediction unit on the encoding side generates an ideal reference line 506 by adding pixel values of pixels of the processing target block 504 in a given prediction direction 502 and taking an average thereof. Next, the intra-prediction unit determines coefficients $x_1$, $x_2$, and $x_3$ to be multiplied for each line so that a difference between a linear combination of a first line A(1, :), a second line A(2, :), and a third line A(3, :) of encoded blocks around the processing target block and the ideal reference line 506 becomes small. For example, the coefficients $x_1$, $x_2$, and $x_3$ may be determined by a least squares method.

Figure 14:
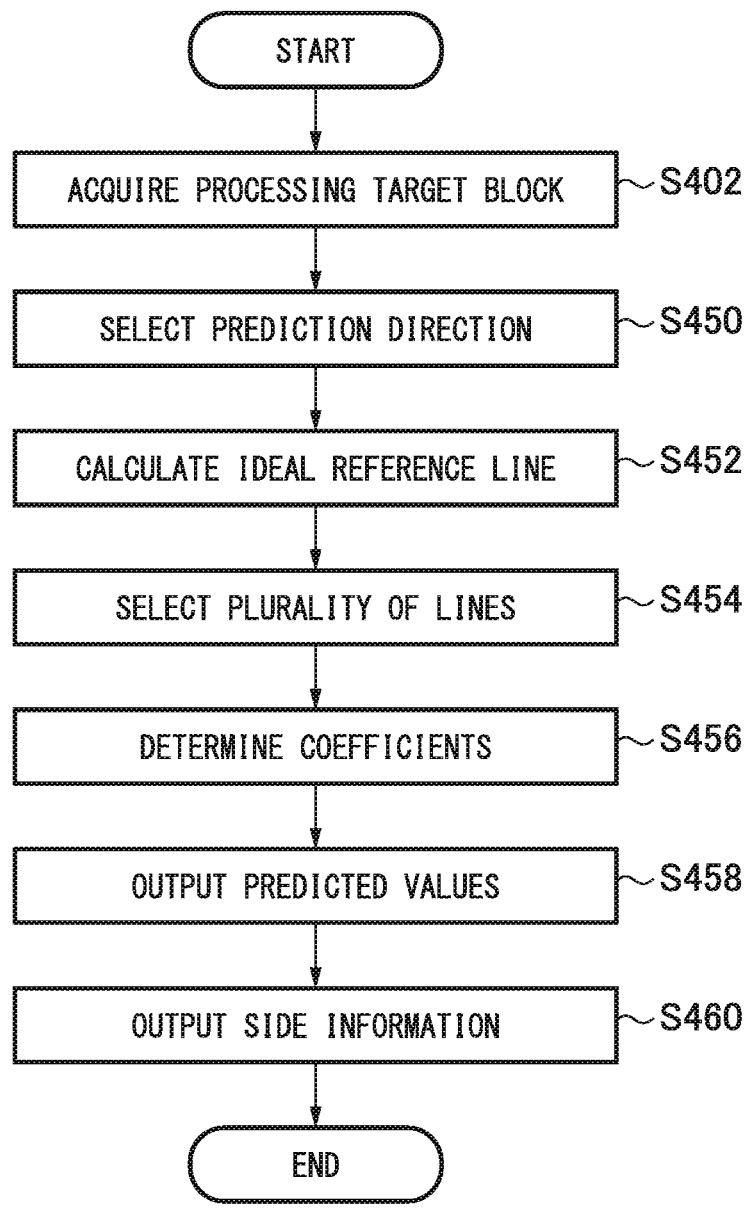
FIG. 14 is a flowchart showing a flow of processing steps in an encoding-side intra-prediction unit according to a third embodiment.

The configuration of the moving-image encoder according to the present embodiment conforms to the configuration of the moving-image encoder 110 shown in FIG. 2, except for an intra-prediction unit. FIG. 14 is a flowchart showing the flow of a series of processing steps in the intra-prediction unit on the encoding side according to the third embodiment. The intra-prediction unit selects a prediction direction (S450). For example, the intra-prediction unit may select the prediction direction using the coarse checking described in the second embodiment. The intra-prediction unit calculates an ideal reference line in the selected prediction direction from actual pixel values of the processing target block (S452). The intra-prediction unit selects a plurality of lines from available encoded blocks (S454). The intra-prediction unit determines linear combination coefficients by the least squares method (S456). In the example of FIG. 13, a coefficient vector $X=(x_1, x_2, x_3)$ is represented by the following Equation 3 when b denotes an ideal reference line and A denotes a matrix including a plurality of selected lines A(1, :), A(2, :), and A(3, :).

Math. 5

$$X=(A^TA)^{-1}A^Tb \quad \text{(Equation 3)}$$

On the basis of a new reference line generated on the basis of the determined coefficients $(x_1, x_2, x_3)$ and the prediction direction, the intra-prediction unit generates and outputs predicted values of pixels of the processing target block (S458). The intra-prediction unit generates side information including the reference flag="1", prediction mode="intra-prediction mode corresponding to the determined prediction direction", and the determined coefficients $(x_1, x_2, x_3)$, and outputs the side information to the entropy encoding unit (S460).

The configuration of the moving-image decoder according to the third embodiment conforms to the configuration of the moving-image decoder according to the first or second embodiment.

The moving-image encoder and the moving-image decoder according to the present embodiment have actions and effects similar to those according to the first embodiment. In addition, because the reference line generated from the plurality of lines is close to an ideal reference line, it is possible to generate a more accurate predicted value in intra-prediction using a new reference line obtained through synthesis.

In the present embodiment, because a code amount increases when a coefficient is added to the side information but a synthetic reference line close to the ideal reference line is given due to the coefficient, a code amount of a prediction residue signal decreases. Therefore, if an effect of reducing the code amount of the prediction residue signal is better, the total code amount can be reduced.

The configurations and operations of the embodiments have been described above. It is understood by those skilled in the art that these embodiments are examples, that various modified examples are possible for components and combinations of processes, and that such modified examples are also included within the scope of the present invention.

INDUSTRIAL APPLICABILITY

According to the present invention, it is possible to improve the accuracy of intra-prediction and minimize an increase in a processing load according to the improved accuracy of intra-prediction.

REFERENCE SIGNS LIST

100 Delivery system
102 Moving-image decoder
104 Display device
106 Network
110 Moving-image encoder

The invention claimed is:

1. A moving-image decoder comprising at least one processor configured to:
    decode a bitstream representing a moving image including a block encoded using intra-prediction;
    generate difference values in pixels of the block by inverse-quantizing and inverse-transforming a level value of the block obtained from a result of decoding the bitstream;
    generate predicted values of pixels of the block according to intra-prediction based on pixel values of reconstructed blocks around the block; and
    reconstruct the block on the basis of the generated difference values and the generated predicted values,
    wherein the at least one processor, in generating the predicted values, is configured to:
        refer to an identifier of the block, which is a reference flag indicating whether or not to generate a reference line based on a plurality of lines of the reconstructed blocks around the block, obtained from the result of decoding the bitstream;
        calculate, based on a prediction direction for use in the intra-prediction obtained from the result of decoding the bitstream, an offset value of each of the plurality of lines in accordance with the prediction direction and cause the each of the plurality of lines to offset by the calculated each of offset values in a direction in which the plurality of lines extend, among a horizontal direction and a vertical direction, when the identifier indicates generation of the reference line;

generate the reference line extending in the direction in which the plurality of lines extend by synthesizing the plurality of lines, each offset by the calculated offset value in the direction in which each of the plurality of lines extends; and generate, using the generated reference line extending in the direction in which the plurality of lines extend, the predicted values of the pixels of the block according to the intra-prediction.

2. The moving-image decoder according to claim 1, wherein the at least one processor is configured to determine a predetermined line of the reconstructed block around the block as the reference line when it is determined not to generate the reference line.

3. The moving-image decoder according to claim 2, wherein the plurality of lines include the predetermined line.

4. The moving-image decoder according to claim 1, wherein the synthesis of the plurality of lines is a linear combination of the plurality of lines.

5. The moving-image decoder according to claim 1, wherein the at least one processor synthesizes the plurality of lines so that a difference between an ideal reference line obtained on the basis of a prediction direction and pixel values and the reference line generated by synthesizing the plurality of lines is small in encoding of the block.

6. A moving-image decoding method comprising:
    decoding a bitstream representing a moving image including a block encoded using intra-prediction;
    generating difference values in pixels of the block by inverse-quantizing and inverse-transforming a level value of the block obtained from a result of decoding the bitstream;
    generating predicted values of pixels of the block according to intra-prediction based on pixel values of reconstructed blocks around the block; and
    reconstructing the block on the basis of the generated difference values and the generated predicted values,
    wherein the generating of the predicted values comprises:
        referring to an identifier of the block, which is a reference flag indicating whether or not to generate a reference line based on a plurality of lines of the reconstructed blocks around the block, obtained from the result of decoding the bitstream;
        calculating, based on a prediction direction for use in the intra-prediction obtained from the result of decoding the bitstream, an offset value of each of the plurality of lines in accordance with the prediction direction and causing the each of the plurality of lines to offset by the calculated each of offset values in a direction in which the plurality of lines extend, among a horizontal direction and a vertical direction, when the identifier indicates generation of the reference line;
        generating the reference line extending in the direction in which the plurality of lines extend by synthesizing the plurality of lines, each offset by the calculated offset value in the direction in which each of the plurality of lines extends and
        generating, using the generated reference line extending in the direction in which the plurality of lines extend, the predicted values of the pixels of the block according to the intra-prediction.

7. A moving-image encoder comprising at least one processor configured to:
    generate predicted values of pixels of a block according to intra-prediction based on pixel values of encoded blocks around the block of a moving image;
    generate difference values in pixels of the block on the basis of the generated predicted values;
    transform and quantize the generated difference values and generate a level value; and
    generate a bitstream by encoding the generated level value, the bitstream includes an identifier which is a reference flag indicating whether or not to generate a reference line based on a plurality of lines of the encoded blocks around the block,
    wherein the at least one processor, in generating the predicted values, is configured to:
        calculate, based on a prediction direction for use in the intra-prediction, an offset value of each of the plurality of lines in accordance with the prediction direction and cause the each of the plurality of lines to offset by the calculated each of offset values in a direction in which the plurality of lines extend, among a horizontal direction and a vertical direction;
        generate the reference line extending in the direction in which the plurality of lines extend by synthesizing the plurality of lines, each offset by the calculated offset value in the direction in which each of the plurality of lines extends and
        generate, using the generated reference line extending in the direction in which the plurality of lines extend, the predicted values of the pixels of the block according to the intra-prediction.

8. The moving-image encoder according to claim 7, wherein a rule when the at least one processor synthesizes the plurality of lines is determined so that a difference between an ideal reference line obtained on the basis of a prediction direction and pixel values and the reference line generated by synthesizing the plurality of lines is small.

9. A moving-image encoding method comprising:
    generating predicted values of pixels of a block according to intra-prediction based on pixel values of encoded blocks around the block of a moving image;
    generating difference values in pixels of the block on the basis of the generated predicted values and pixel values corresponding thereto; and
    transforming and quantizing the generated difference values and generating a level value;
    generating a bitstream by encoding the generated level value, the bitstream includes an identifier which is a reference flag indicating whether or not to generate a reference line based on a plurality of lines of the encoded blocks around the block,
    wherein the generating of the predicted values comprises:
        calculating, based on a prediction direction for use in the intra-prediction, an offset value of each of the plurality of lines in accordance with the prediction direction and causing the each of the plurality of lines to offset by the calculated each of offset values in a direction in which the plurality of lines extend, among a horizontal direction and a vertical direction;
        generating the reference line extending in the direction in which the plurality of lines extend by synthesizing the plurality of lines, each offset by the calculated offset value in the direction in which each of the plurality of lines extends; and generating, using the generated reference line extending in the direction in which the plurality of lines extend, the predicted values of the pixels of the block according to the intra-prediction.

10. A non-transitory computer readable recording medium comprising:
a program for causing a computer to function as a moving-image decoder or a moving-image encoder,
wherein the moving-image decoder is configured to execute processing comprising:
decoding a bitstream representing a moving image including a block encoded using intra-prediction;
generating difference values in pixels of the block by inverse-quantizing and inverse-transforming a level value of the block obtained from a result of decoding the bitstream;
generating predicted values of pixels of the block according to intra-prediction based on pixel values of reconstructed blocks around the block; and
reconstructing the block on the basis of the generated difference values and the generated predicted values,
wherein the generating of the predicted values comprises:
referring to an identifier of the block, which is a reference flag indicating whether or not to generate a reference line based on a plurality of lines of the reconstructed blocks around the block, obtained from the result of decoding the bitstream;
calculating, based on a prediction direction for use in the intra-prediction obtained from the result of decoding the bitstream, an offset value of each of the plurality of lines in accordance with the prediction direction and causing the each of the plurality of lines to offset by the calculated each of offset values in a direction in which the plurality of lines extend, among a horizontal direction and a vertical direction, when the identifier indicates generation of the reference line;
generating the reference line extending in the direction in which the plurality of lines extend by synthesizing the plurality of lines, each offset by the calculated offset value in the direction in which each of the plurality of lines extends; and
generating, using the generated reference line extending in the direction in which the plurality of lines extend, the predicted values of the pixels of the block according to the intra-prediction,
wherein the moving-image encoder is configured to execute processing comprising:
generating predicted values of pixels of a block according to the intra-prediction based on pixel values of encoded blocks around the block of the moving image;
generating difference values in pixels of the block on the basis of the generated predicted values and pixel values corresponding thereto; and
transforming and quantizing the generated difference values and generating a level value;
generating the bitstream by encoding the generated level value, the bitstream includes the identifier which is the reference flag indicating whether or not to generate a reference line based on the plurality of lines of the encoded blocks around the block,
wherein the generating of the predicted values comprises:
calculating, based on a prediction direction for use in the intra-prediction, an offset value of each of the plurality of lines in accordance with the prediction direction and causing the each of the plurality of lines to offset by the calculated each of offset values in the direction in which the plurality of lines extend, among the horizontal direction and the vertical direction; and
generating the reference line extending in the direction in which the plurality of lines extend by synthesizing the plurality of lines, each offset by the calculated offset value in the direction in which each of the plurality of lines extends; and
generating, using the generated reference line extending in the direction in which the plurality of lines extend, the predicted values of the pixels of the block according to the intra-prediction.

* * * * *

UNITED STATES PATENT AND TRADEMARK OFFICE
CERTIFICATE OF CORRECTION

PATENT NO. : 11,451,771 B2
APPLICATION NO. : 16/329601
DATED : September 20, 2022
INVENTOR(S) : Q. Yao et al.

It is certified that error appears in the above-identified patent and that said Letters Patent is hereby corrected as shown below:

On the Title Page

Page 2 (right column, Line 23 under item (56) "OTHER PUBLICATIONS"), please change "Coding Coding" to -- Coding --.

In the Claims

Column 15, Line 65 (Claim 6), please change "extends" to -- extends; --.
Column 16, Line 30 (Claim 7), please change "extends" to -- extends; --.

Signed and Sealed this
Twenty-first Day of March, 2023

Katherine Kelly Vidal
*Director of the United States Patent and Trademark Office*